United States Patent [19]
Russell

[11] Patent Number: 6,126,356
[45] Date of Patent: Oct. 3, 2000

[54] GEAR MOUNTING USING TUBING AND SNAP-FIT CAPS

[75] Inventor: Robert D. Russell, Pittsford, N.Y.

[73] Assignee: Xerox Corporation, Stamford, Conn.

[21] Appl. No.: 09/106,155

[22] Filed: Jun. 29, 1998

[51] Int. Cl.[7] ........................................ F16B 5/04
[52] U.S. Cl. .................... 403/24; 403/252; 403/289; 74/421 R; 384/296
[58] Field of Search ........................ 403/252, 254, 403/255, 256, 150, 152, 153, 161, 289, 24, 408.1; 399/107, 110, 122; 384/295, 296; 74/421 R; 411/508, 509, 913

[56] References Cited

U.S. PATENT DOCUMENTS

| | | | |
|---|---|---|---|
| 3,099,895 | 8/1963 | Beebe | 403/289 X |
| 3,188,679 | 6/1965 | Wubbe | 403/161 X |
| 3,438,686 | 4/1969 | Stone | 384/296 |
| 3,784,297 | 1/1974 | Ito et al. | 355/3 |
| 3,865,437 | 2/1975 | Crosby | 403/289 X |
| 3,883,240 | 5/1975 | Ito et al. | 355/3 DD |
| 4,089,600 | 5/1978 | Ito et al. | 355/3 CH |
| 4,435,074 | 3/1984 | Midorikawa et al. | 355/15 |
| 5,045,890 | 9/1991 | DeBolt et al. | 355/284 |
| 5,049,944 | 9/1991 | DeBolt et al. | 355/284 |
| 5,143,500 | 9/1992 | Schuring et al. | 411/508 X |
| 5,553,962 | 9/1996 | Eustache | 403/161 X |
| 5,775,859 | 7/1998 | Anscher | 411/509 X |

*Primary Examiner*—Harry C. Kim
*Attorney, Agent, or Firm*—Andrew D. Ryan

[57] ABSTRACT

A mounting apparatus for mounting a rotating element to a housing is disclosed. The housing defines an opening through a wall of the housing. The mounting apparatus includes a tube including an aperture therethrough. The tube includes a first tube portion thereof including a cylindrical outer periphery and a second tube portion thereof connected to the first tube portion and securable to the opening through the wall of the housing. The mounting apparatus further includes a cap including a body portion thereof having a body outer periphery thereof matingly fitted to the aperture of the tube. The cap further includes a flange extending outwardly from a first end of the body portion in a direction perpendicular to the body outer periphery of the body portion of the cap. The cap further including a connector extending from a second end of the body portion opposed to the first end. The connector is utilized for connecting the cap to the tube.

20 Claims, 5 Drawing Sheets

GEAR MOUNTING USING TUBING AND SNAP-FIT CAPS

The present invention relates to an apparatus for printing machines. More specifically, the invention relates to gear mounting arrangement.

The features of the present invention are useful for use in machines with gear trains. One such is type of machine is a printing machine, for example, electrophotographic printing machines.

In the process of electrophotographic printing, a photoconductive surface is charged to a substantially uniform potential. The photoconductive surface is image wise exposed to record an electrostatic latent image corresponding to the informational areas of an original document being reproduced. This records an electrostatic latent image on the photoconductive surface corresponding to the informational areas contained within the original document. Thereafter, a marking material such as toner particles is transported into contact with the electrostatic latent image in a region known as the development zone. Toner particles are attracted from the magnetic roller to the latent image. The resultant toner powder image is then transferred from the photoconductive surface to a copy sheet and permanently affixed thereto. The foregoing generally describes a typical mono-color single component development electrophotographic copying machine.

Machines often include rotating members which are typically rotated by a motor and a series of gears which are connected to the motor in the form of a transmission or series of gears, each gear being mounted independently on a shaft. Gear mounting arrangements are thus found on many machines of all types. Xerographic copying and printing machines typically utilize a large number of gears. The gears are used to drive the paper handling of the machine as well as, for example, the development and cleaning stations of the xerographic process.

The gears are required to be mounted to housings within the machines. Gears typically are mounted on metal shafts extending from the housing. The shafts are typically welded to the housings and the shafts include the E-rings to secure the gears.

The use of E-rings is very costly in that the E-groove is very costly to machine into the shafts. Further, the E-rings are difficult and expensive to manufacture. Furthermore, the E-rings are difficult to assemble onto the E-ring grooves of the shaft and are very difficult to disassemble from the E-ring grooves, particularly when servicing a machine in the field.

The following disclosures may be relevant to various aspects of the present invention:

U.S. Pat. No. 5,049,944
Patentee: DeBolt et al.
Issue Date: September 17, 1991
U.S. Pat. No. 5,045,890
Patentee: DeBolt et al.
Issue Date: September 3, 1991
U.S. Pat. No. 4,435,074
Patentee: Midorikawa et al.
Issue Date: March 6, 1984
U.S. Pat. No. 4,089,600
Patentee: Ito et al.
Issue Date: May 16, 1978
U.S. Pat. No. 3,883,240
Patentee: Ito et al.
Issue Date: May 13, 1975
U.S. Pat. No. 3,784,297
Patentee: Ito et al.
Issue Date: January 8, 1974

U.S. Pat. No. 5,049,944 discloses an apparatus and method for applying offset preventing liquid to a fuser roll including an oil impregnated web member adapted to be moved by a motor from a supply core to a take up core; and a control to vary the duty cycle operation of the motor to drive the web member at a relatively constant liner speed at a contact nip, the control including a timer to monitor the cumulative time of operation of the motor and to progressively decrease the duty cycle of the motor in response to the cumulative time of operation wherein the progressively decreased duty cycle of operation compensates for the increasing radius of the web member on the take up core to maintain the relatively constant linear speed at the contact nip.

U.S. Pat. No. 5,045,890 discloses a fuser apparatus for heat fusing toner images to a print substrate has a fuser roll and a pressure roll forming a fusing nip therebetween, a system to deliver liquid release agent to the fuser roll including a movable web having a first side and a second side supported between a web supply roll and a web take-up roll, a housing supporting the supply roll and take-up roll such that one of the supply and take-up rolls is on one side of the fuser roll and the other is on the other side of the fuser roll and the first side of the movable web is in contact with the fuser roll along a path parallel to its longitudinal axis. The movable web is impregnated with a liquid release agent and the movable web, supply roll and take-up roll are reversibly mounted in the housing to deliver liquid release agent to the fuser roll initially from the first side of the movable web followed by reversing the location of the supply roll and take-up roll in the support housing so that the second side of the impregnated web is in contact with the fuser roll to deliver release agent. The movable web is urged into delivery engagement with the fuser roll by an open celled foam pinch roll impregnated with liquid release agent.

U.S. Pat. No. 4,435,074 discloses a lubricant film applied to the drum to maintain the coefficient of friction between the drum and blade constant and thereby ensure efficient cleaning after a photosensitive drum is cleaned of residual toner by a scraper blade. The film forming material is in the form of a block and is applied to the drum by a rotary brush. The brush is selectively moved into and out of engagement with the drum to control the amount of film application. The engagement of the brush with the drum is controlled in accordance with a sensed parameter such as a number of copies produced, the coefficient of friction between the drum and a sensor blade, etc.

U.S. Pat. No. 4,089,600 discloses a corona discharger includes a shield and a discharge wire extended between opposed ends of the shield and supported between its ends. The position of the wire is adjustable to control the distance between the wire and a surface of a member to be subjected to the corona discharge and a spring is arranged to maintain tension on the discharge wire regardless of the position of adjustment of the wire.

U.S. Pat. No. 3,883,240 discloses an electrophotographic copying machine which includes a housing, an original holder reciprocable upon the upper surface of an electrophotographic photosensitive member unit that includes an electrophotographic photosensitive member mounted for rotation at substantially the center of the housing. Charging apparatus is mounted on one side of the electrophotographic photosensitive member and an optical system for effecting exposure through a slit and developing apparatus is provided. Fixing apparatus and cleaning apparatus are disposed on the other side of the electrophotographic photosensitive member. Copy medium feeding elements and image transfer members are disposed below the electrophotosensitive member, and the electrophotosensitive member unit is mounted in the housing so as to be removable upwardly therefrom.

U.S. Pat. No. 3,784,297 discloses an electrophotographic copying machine of this invention has an original holder reciprocating on the upper surface of an electrophotographic photosensitive member which is rotatably fixed to the supporting device therefor. The charging device is arranged on one side of the photosensitive member. The copying machine further includes optical system for slit exposure, developing device, fixing device and cleaning device, which are arranged on the other side of the photosensitive member. Copy sheet feeding device, image transfer device are also arranged below the photosensitive member.

In accordance with one aspect of the present invention, there is provided a mounting apparatus for mounting a rotating element to a housing. The housing defines an opening through a wall of the housing. The mounting apparatus includes a tube including an aperture therethrough. The tube includes a first tube portion thereof including a cylindrical outer periphery and a second tube portion thereof connected to the first tube portion and securable to the opening through the wall of the housing. The mounting apparatus further includes a cap including a body portion thereof having a body outer periphery thereof matingly fitted to the aperture of the tube. The cap further includes a flange extending outwardly from a first end of the body portion in a direction perpendicular to the body outer periphery of the body portion of the cap. The cap further including a connector extending from a second end of the body portion opposed to the first end. The connector is utilized for connecting the cap to the tube.

In accordance with another aspect of the present invention, there is provided a mounting apparatus for mounting a gear to a cylindrical opening through a wall of a housing for use in a printing machine. The mounting apparatus includes a cylindrical tube defining an aperture therethrough. The tube includes a first tube portion thereof including a cylindrical outer periphery and a shoulder extending inwardly from one end of the cylindrical outer periphery. The tube further includes a cylindrical stem extending perpendicularly from the shoulder in a direction opposed to the first tube portion. The cylindrical tube has an outer periphery thereof matingly fittable with the cylindrical opening. The cylindrical tube also has a distal end further including a lip extending outwardly from the outer periphery of the cylindrical stem. The lip is formed by spin riveting the tubing to the wall of the housing; The mounting apparatus further includes a cap including a body portion having an outer periphery thereof matingly fitted to the aperture of the cylindrical tube. The cap further includes a flange extending outwardly from a first end of the body portion in a direction perpendicular to the outer periphery of the body portion of the cap. The cap further includes a pliable lip extending from a second end of the cap in a direction perpendicular to the outer periphery of the body portion of the cap. The lip has a first, constrained position for permitting the lip to be fitted within the aperture of the cylindrical tube and a second relaxed position for permitting the lip to secure the cap to the cylindrical tube.

In accordance with yet another aspect of the present invention, there is provided an electrophotographic printing machine of the type having a mounting apparatus for mounting a gear to a cylindrical opening through a wall of a housing. The mounting apparatus includes a tube including an aperture therethrough. The tube includes a first tube portion thereof including a cylindrical outer periphery and a second tube portion thereof connected to the first tube portion and securable to the opening through the wall of the housing. The mounting apparatus further includes a cap including a body portion thereof having a body outer periphery thereof matingly fitted to the aperture of the tube. The cap further includes a flange extending outwardly from a first end of the body portion in a direction perpendicular to the body outer periphery of the body portion of the cap. The cap further including a connector extending from a second end of the body portion opposed to the first end. The connector is utilized for connecting the cap to the tube.

In accordance with a further aspect of the present invention, there is provided a method for mounting a rotating element to a wall of a housing. The method includes the steps of preparing an opening through the wall, placing a hollow tube into the wall, spin riveting the tube to the wall, placing the rotating element over the hollow tube, inserting a cap into the hollow tube and securing the cap to the hollow tube.

The invention will be described in detail herein with reference to the following figures in which like reference numerals denote like elements and wherein.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 8:
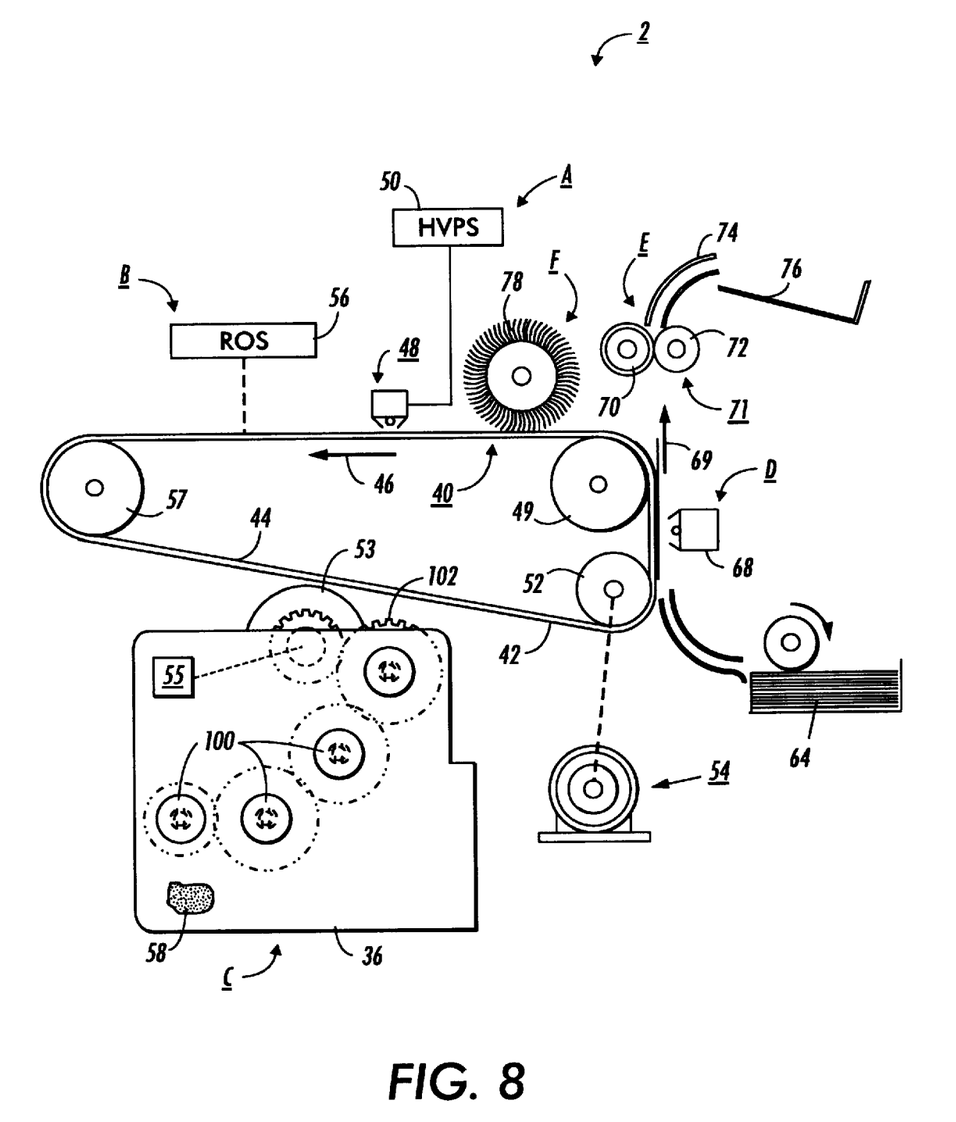
FIG. 8 is a schematic elevational view of an electrophotographic printing machine incorporating the snap in gear mounting feature of the present invention.

For a general understanding of the illustrative electrophotographic printing machine incorporating the features of the present invention therein, reference is made to the drawings. In the drawings, like reference numerals have been used throughout to designate identical elements. FIG. 8 schematically depicts the various components of an electrophotographic printing machine incorporating the rotating element mounting feature of the present invention therein. Although the rotating element mounting feature of the present invention is particularly well adapted for use in the illustrative printing machine, it will become evident that the rotating element mounting feature is equally well suited for use in a wide variety of printing machines and are not necessarily limited in its application to the particular embodiment shown herein.

Referring now to FIG. 8, the electrophotographic printing machine shown employs a photoconductive belt 40, although photoreceptors in the form of a drum are also known, and may be substituted therefor. The belt 40 has a photoconductive surface 42 deposited on a conductive substrate 44. Belt 40 moves in the direction of arrow 46 to advance successive portions thereof sequentially through the various processing stations disposed about the path of movement thereof. Motor 54 rotates roller 52 to advance belt 40 in the direction of arrow 46. Roller 52 is coupled to motor 54 by suitable means such as a drive (not shown). The belt 40 is supported by rollers 49, 57 and 52.

Initially successive portions of belt 40 pass through charging station A. At charging station A, a corona generating device, indicated generally by the reference numeral 48, charges the belt 40 to a selectively high uniform electrical potential, preferably negative. Any suitable control, well known in the art, for example HVPS (High Voltage Power Supply) 50 may be employed for controlling the corona generating device 48.

At imaging station S, in a digital printing machine, as shown in FIG. 8, a ROS (Remote Optical Scanner) 56 may lay out the image in a series of horizontal scan lines with each line having a specific number of pixels per inch. The ROS 56 may include a laser (not shown) having a rotating polygon mirror block associated therewith. The ROS 56 exposes the photoconductive surface 42 of the belt 40.

It should be appreciated that the printing machine may alternatively be a light lens copier. In a light lens copier a document to be reproduced is placed on a platen, located at the imaging station, where it is illuminated in known manner by a light source such as a tungsten halogen lamp. The document thus exposed is imaged onto the drum by a system of mirrors. The optical image selectively discharges the surface of the drum in an image configuration whereby an electrostatic latent image of the original document is recorded on the drum at the imaging station.

At development station C, a magnetic development system or unit, indicated generally by the reference numeral 36 advances developer materials into contact with the electrostatic latent images. Preferably, the developer unit 36 includes a magnetic developer roller 53 mounted in a housing. The roller 53 advances toner particles into contact with the latent image. Appropriate developer biasing is may be accomplished via power supply 55, electrically connected to developer unit 36.

The developer unit 36 develops the charged image areas of the photoconductive surface. This developer unit contains magnetic black toner, for example, particles 58 which are charged by the electrostatic field existing between the photoconductive surface and the electrically biased developer roll in the developer unit. Power supply 55 electrically biases the magnetic roll 53.

A sheet of support material 64 is moved into contact with the toner image at transfer station D. The sheet of support material is advanced to transfer station D by a suitable sheet feeding apparatus, not shown. Preferably, the sheet feeding apparatus includes a feed roll contacting the uppermost sheet of a stack copy sheets. Feed rolls rotate so as to advance the uppermost sheet from the stack into a chute which directs the advancing sheet of support material into contact with the photoconductive surface of belt 40 in a timed sequence so that the toner powder image developed thereon contacts the advancing sheet of support material at transfer station D.

Transfer station D includes a corona generating device 68 which sprays ions of a suitable polarity onto the backside of sheet 64. This attracts the toner powder image from the belt 40 to sheet 64. After transfer, the sheet continues to move, in the direction of arrow 69, onto a conveyor (not shown) which advances the sheet to fusing station E.

Fusing station E includes a fuser assembly, indicated generally by the reference numeral 71, which permanently affixes the transferred powder image to sheet 64. Preferably, fuser assembly 71 comprises a heated fuser roller 70 and a pressure roller 72. Sheet 64 passes between fuser roller 70 and pressure roller 72 with the toner powder image contacting fuser roller 70. In this manner, the toner powder image is permanently affixed to sheet 64. After fusing, a chute 74 guides the advancing sheet 64 to a catch tray 76 for subsequent removal from the printing machine by the operator. It will also be understood that other post-fusing operations can be included, for example, stapling, binding, inverting and returning the sheet for duplexing and the like.

After the sheet of support material is separated from the photoconductive surface 42 of belt 40, the residual toner particles carried by image and the non-image areas on the photoconductive surface are charged to a suitable polarity and level by a preclean charging device (not shown) to enable removal therefrom. These particles are removed at cleaning station F. The vacuum assisted, electrostatic, brush cleaner unit 78 is disposed at the cleaner station F. The cleaner unit has a brush roll that rotates at relatively high speeds which creates mechanical forces that tend to sweep the residual toner particles into an air stream (provided by a vacuum source), and then into a waste container. Subsequent to cleaning, a discharge lamp or corona generating device (not shown) dissipates any residual electrostatic charge remaining prior to the charging thereof for the next successive imaging cycle.

It is believed that the foregoing description is sufficient for purposes of the present application to illustrate the general operation of an electrophotographic printing machine incorporating the apparatus of the present invention therein.

According to the present invention and referring again to FIG. 8, a snap fit gear mounting 100 is shown supporting magnetic roller gear 102 for rotating the magnetic roller 53 within developer unit 36. While as shown in the FIG. 8, the snap fit gear mounting 100 is utilized within the developer unit 36, it should be appreciated that the snap fit gear mounting arrangement 100 of the present invention may be used anywhere within the printing machine 2. For example, snap fit gear mounting may be utilized within the cleaning unit F, the fusing unit E, or anywhere along the paper path of the printing machine. Further the snap fit gear mounting arrangement 100 may be utilized to support the photoconductive belt 40.

Figure 7:
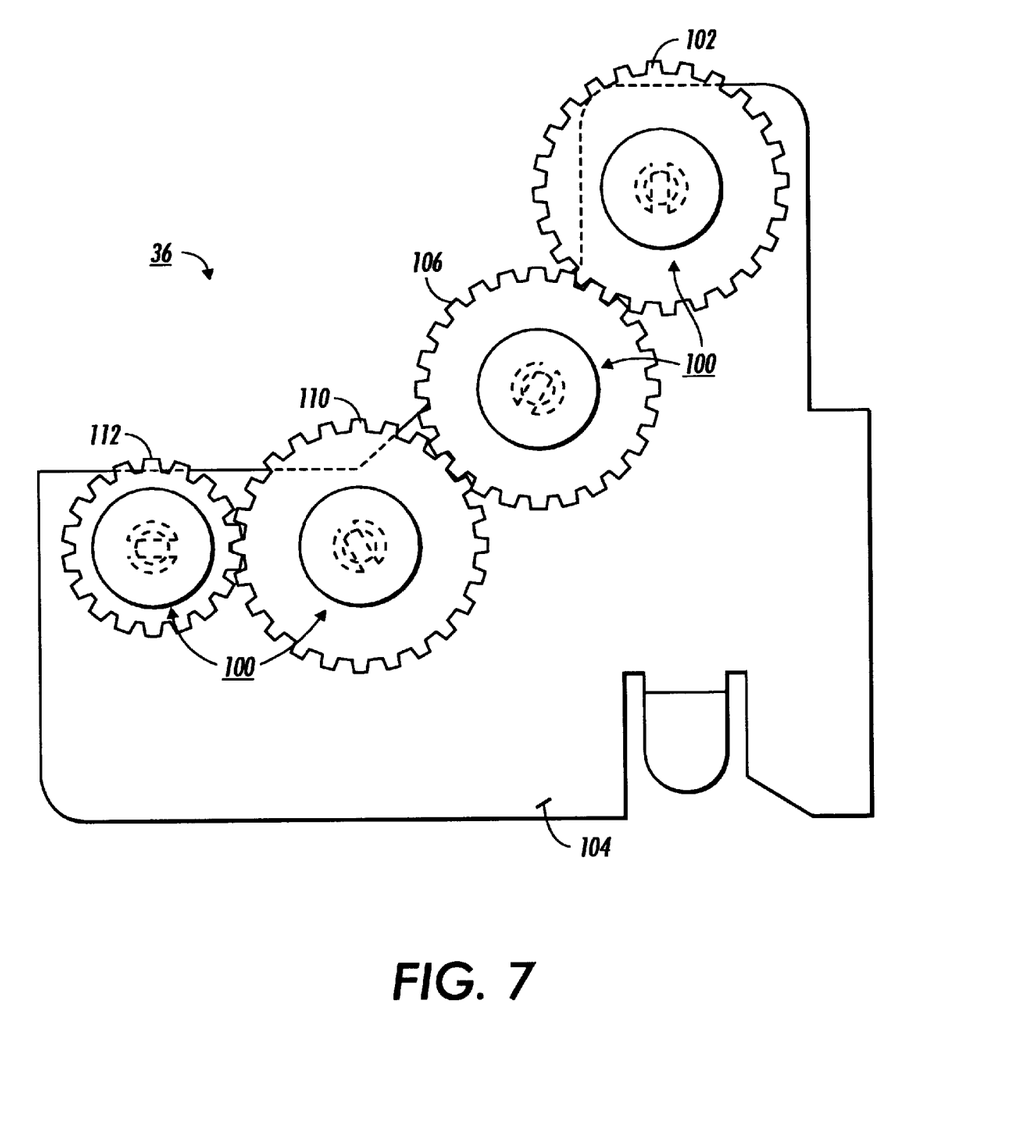
FIG. 7 is a plan view of the housing of FIG. 4.

Referring now to FIG. 7, the developer unit 36 is shown in greater detail. The snap fit gear mounting arrangement 100 is secured to a mounting wall 104 of the developer unit 36, magnetic roller gear 102 is secured to the snap fit gear mounting arrangement 100. Similarly, the second gear 106, third gear 110 and fourth gear 112 may be secured to the developer unit 36 by the use of the snap fit gear mounting arrangement 100 which is mounted to mounting wall 104.

Figure 1:
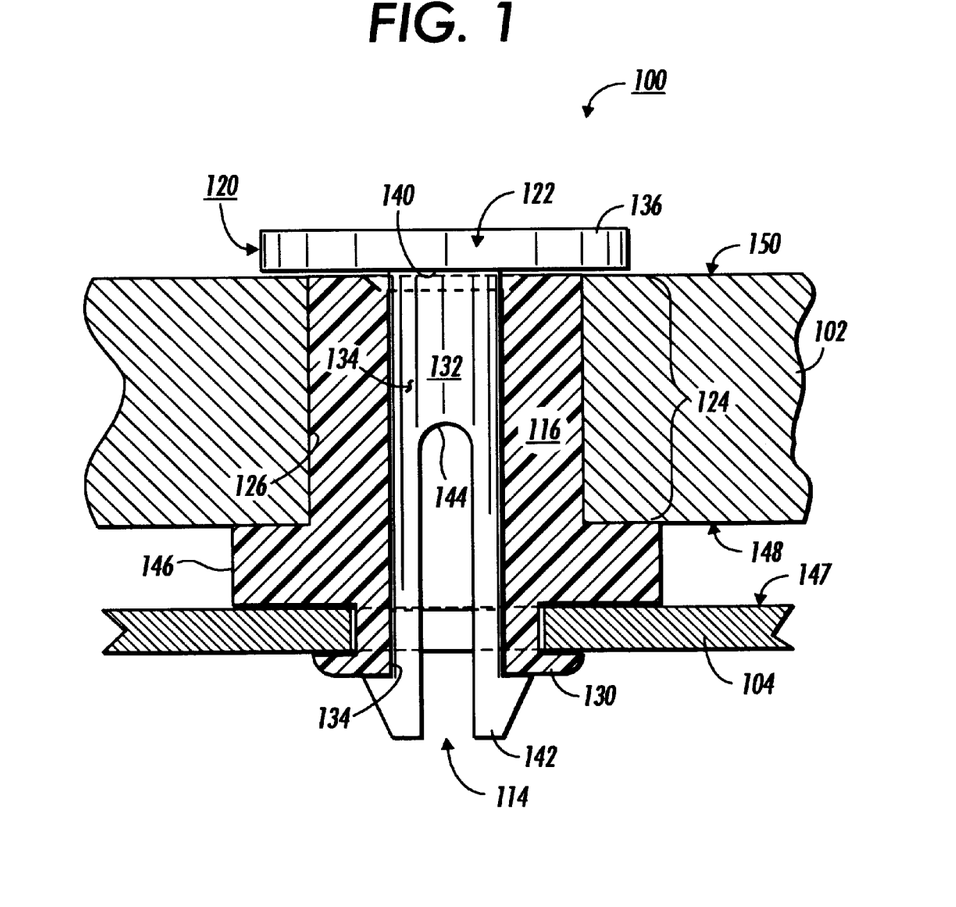
FIG. 1 is a plan view partially in section of a gear assembly including the snap in gear mounting feature of the present invention.

Referring now to FIG. 1, snap fit gear mounting arrangement 100 according to the present invention, is shown in greater detail. The gear mounting arrangement 100 is utilized for mounting a rotating element, for example gear 102 to a housing, for example in the form of a developer unit 36 (see FIGS. 7 and 8). The developer unit 36 includes the mounting wall 104.

Referring again to FIG. 1, the mounting wall 104 includes an opening 114 therethrough. The gear mounting arrangement 100 includes a tube 116 as well as a cap 120.

The tube 116 includes an aperture 122 therethrough. The tube includes a first tube portion 124 which includes a cylindrical outer periphery 126. The tube also includes a second tube portion 130 which is securable to wall 104 at the opening 114 of wall 104 of the developer unit 36.

The cap 120 includes a body portion 132 thereof having a body outer periphery 134 which matingly fits to the aperture 122 of the tube 116. The cap 120 preferably includes a flange 136 extending outwardly from a first end 140 of the body portion 132 in a direction perpendicular to the body outer periphery 134 of the body portion 132 of the cap 120. The cap 120 preferably further includes a connector 142 extending from a second end 144 of the body portion 132 of the cap 120 opposed to the first end 140 of the cap 120.

The tube 116, as shown in FIG. 1, includes a collar 146 which extends outwardly from outer periphery 126 of first tube portion 124 of the tube 116. The collar serves to provide a thrust face for the gear 102. It should be appreciated that the tube 116 for simplicity may be made without the collar 146 and surface 147 of the mounting wall 104 may then be utilized to provide a thrust face for and to contain first face 148 of the gear 102. The second gear face 150 is contained by flange 136 of the cap 120.

Figure 2:
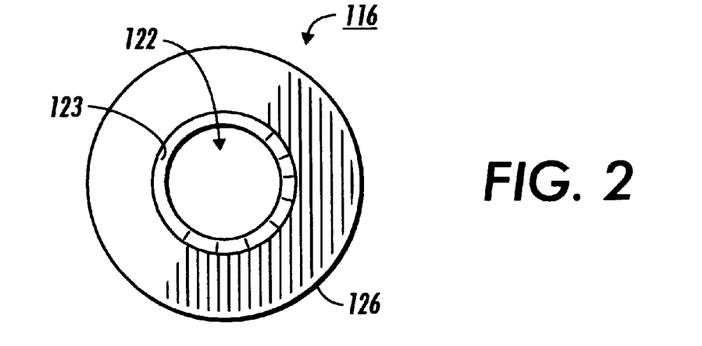
FIG. 2 is a top view of a bushing for the use with the snap in gear mounting feature of the present invention.
Figure 3:
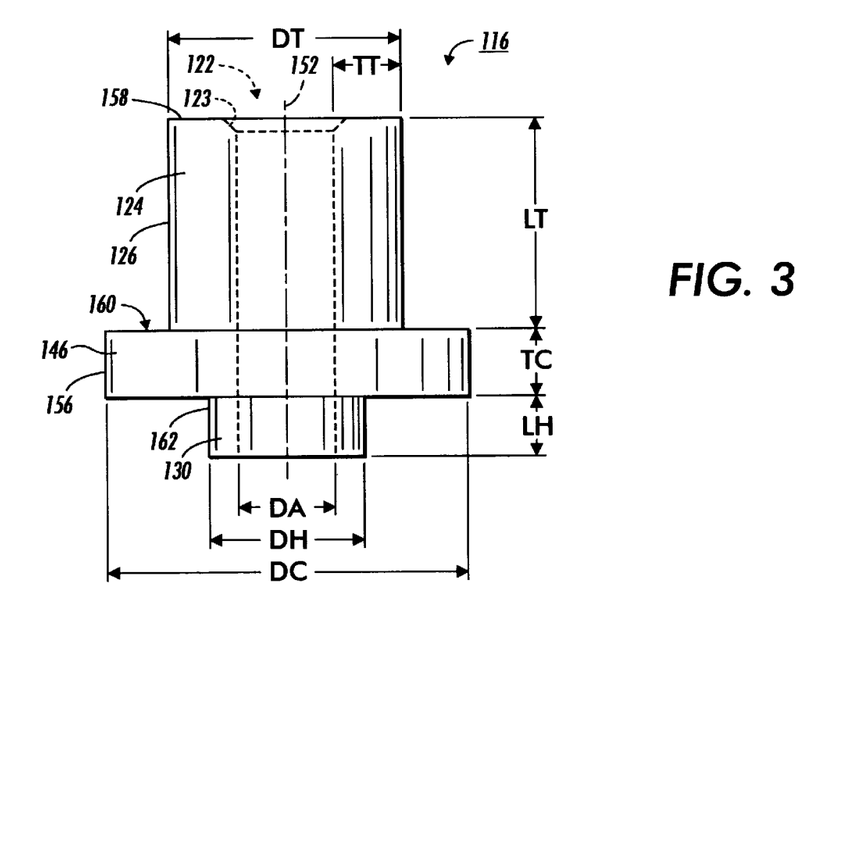
FIG. 3 is a plan view of a bushing for the use with the snap in gear mounting feature of the present invention.

Referring now to FIGS. 2 and 3, tube 116 is shown in greater detail. The tube 116 includes the aperture 122 which extends centrally along longitudinal axis 152 of the tube 116. The aperture 122 may have any shape capable of receiving the cap 120, and, preferably, for simplicity, has a cylindrical shape defined by diameter DA of, for example, 0.26 inches. The tube 116 includes the first tube portion 124 which has a preferably a cylindrical outer periphery 126 which is defined by diameter DT of, for example, 0.44 inches.

As shown in FIGS. 2 and 3, the tube 116 further includes the collar 146 which extends from a first end of the first tube portion 124. The collar 146 has a outer periphery 156 which may have any shape and may, for example, be circular having a diameter DC of, for example, 0.60 inches. It should be appreciated that the outer periphery 156 of the collar 146 may have any shape. The significant features of the collar being that it provides a thrust face 160 for supporting the gear 102 and a wider more stable support for the tube 116 against the wall 104. Extending from the collar 146 is a second tube portion 130. The second tube portion 130 has an outer periphery 162 which conforms to inner periphery 164 of the wall 104 of FIG. 4.

Referring again to FIGS. 2 and 3, the second tubular portion 130 may have any suitable shape and may, for example, have a cylindrical periphery 162 defined by a diameter DH of, for example, 0.34 inches. The first tubular portion 126 of the tube 116 has a wall thickness TT of, for example, 0.09 inches. The first tubular portion 124 has a length LT of, for example, 0.40 inches. The collar 146 has a thickness TC of, for example, 0.16 inches. The second tubular portion 130 as shown in FIGS. 2 and 3 is in an unassembled condition and in this unassembled configuration has a length LH of, for example, 0.20 inches.

It should be appreciated that the dimensions given for the tube 116 and the cap 120 are merely illustrative and represent a shape and size that the applicants have found to be effective. It should be appreciated that the tube and cap may be scaled into larger dimensions and into smaller dimensions. It should also be appreciated that considerable latitude may be had for the relative size of the dimensions.

Figure 4:
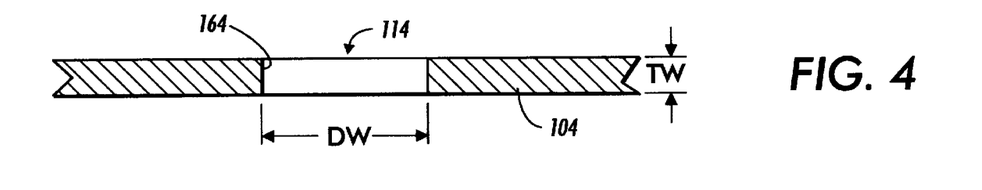
FIG. 4 is a plan view partially in section of a housing for mounting the snap in gear mounting feature of the present invention.

Referring now to FIG. 4, the mounted wall 104 is shown with an opening 114 to receive the tube 116. While, as stated earlier, the opening 114 of the wall 104 may have an inner periphery 164 of any suitable shape compatible with the tube 116. It should be appreciated that, for simplicity, the opening 114 may preferably be cylindrical and be defined by a diameter DW which is matingly fitted to diameter DH of the second tube portion 130 of the tube 116. For example, the diameter DW may be 0.35 inches.

The wall 104 may have any suitable thickness capable of supporting the tube 116 and the gear 102 and may, for example, have a wall thickness TW of, for example, 0.10 inches. First end 158 of the tube 116 may include a chamfer 123 adjacent the aperture 122 to assist in the assembly of the cap 120 thereto.

The tube 116 may be made of any suitable durable material such as a plastic or a metal. Preferably, however, the tube 116 is made up of a malleable metal such as stainless steel, for example, from stainless steel tubing.

Figure 5:
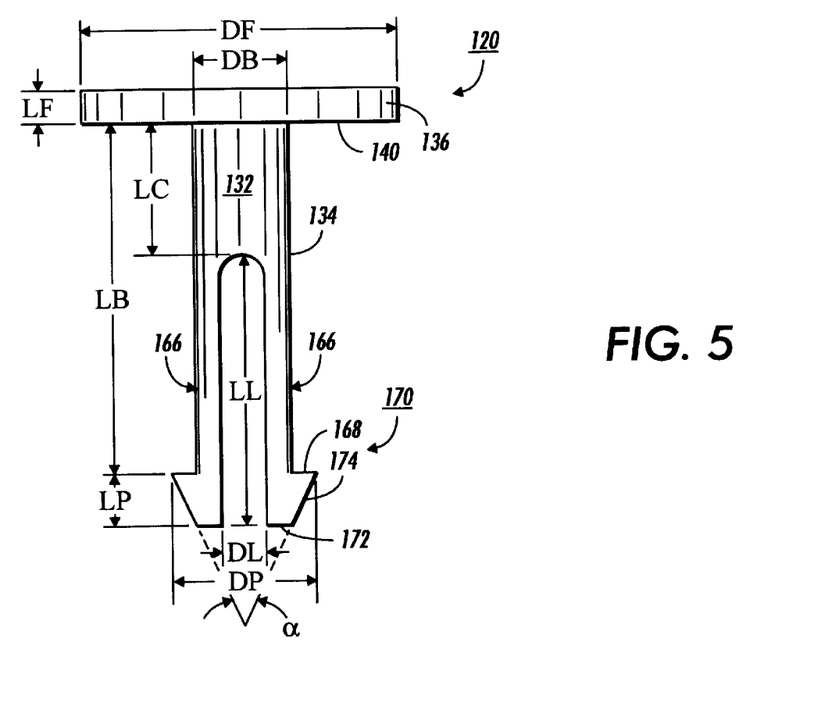
FIG. 5 is a plan view of a snap pin for the snap in gear mounting feature of the present invention.

Referring now to FIG. 5, the cap 120 is shown in greater detail. The cap 120 includes a body portion 132. The body portion 132 has a body outer periphery 134 which is slidably fitted to the aperture 122 of the tube 116 (see FIG. 1). The body portion 132 includes a pair of spaced-apart legs 166 adjacent second end 168 of the body portion 132 opposed to first end 140 of the body portion 132.

The body portion 132 includes a cylindrical section which has a length LC of approximately 0.20 inches, for example. The body portion 132 has an outer periphery 134 which may have any shape that mates with he tube 116 and, for example, may be cylindrical with an outer periphery defined by diameter DB of approximately 0.25 inches and may have a body portion length LB of, for example, 1.2 inches. The legs 116 are preferably symmetrical and spaced apart and have a length LL of, for example, 0.60 inches. The length LL is determined to provide sufficient flex to the legs 166 to provide assembly and securing of the cap 120 to the gear mounting arrangement 100.

The connector 142 may have any suitable shape and may, for example, include a protrusion 170 but preferably includes a pair of spaced-apart symmetrical protrusions 170 located on distal end 172 of the legs 166. The protrusions 170 may, to assist assembly, include a tapered outer periphery 174 defined by an included angle $\alpha$ of, for example, 20 degrees. The protrusions 170 may have any suitable size sufficient to restrain the cap 120 within the gear mounting arrangement. For example, the protrusion 170 may have a length LP of, for example, 0.10 inches and a outer diameter DP of, for example, 0.35 inches. The legs 166 may be divided or separated by a distance DL of, for example, 0.10 inches.

The cap includes a flange 136 which extends past outer periphery 126 of the tube 116. The flange 136 may for simplicity have a cylindrical periphery defined by flange diameter DF of, for example, 0.40 inches and a thickness of, for example 0.20 inches.

The cap 120 may be made of any suitable durable material which has sufficient resiliency for the connector 142. For example, the cap 120 may be made of a plastic, for example, ABS (acrylonitrile butadiene styrene) or acetal.

Figure 6:
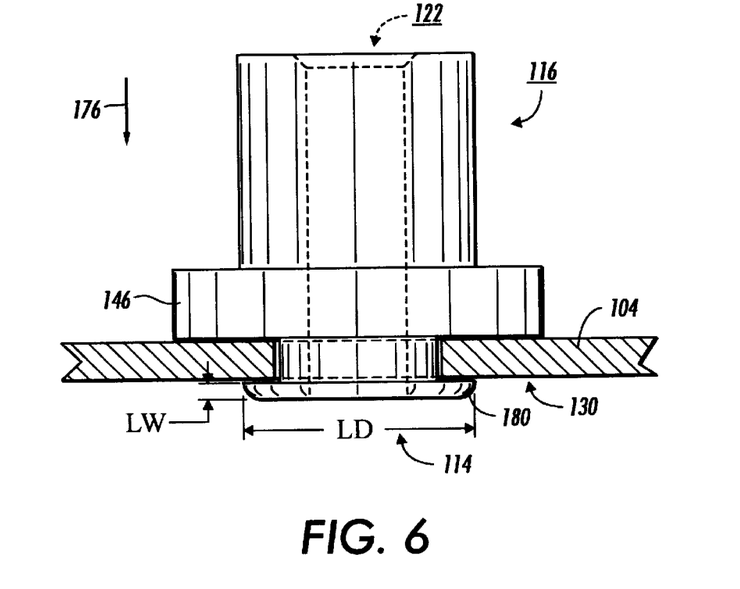
FIG. 6 is plan view partially in section of the bushing of FIG. 3 installed in the using of FIG. 4.

Referring now to FIG. 6, the tube 116 is shown installed into the wall 104. The second tubular portion 130 is installed by inserting the tube 116 in the direction of arrow 176 such that collar 146 rests against wall 104. The second tubular portion 130 is formed or shaped by any suitable method to create a lip 180 which traps the tube 116 within the wall 104. The lip 180 may have any dimensions capable of restraining the tube 116 and, for example, may be defined by a lip thickness LW of, for example, 0.04 inches and a lip diameter LD of, for example, 0.40 inches. For example, the tube 116 may be installed into the wall 104 by means of coining, localized heating and forming, or preferably spin riveting the tube 116 about opening 114 to create the lip 116.

By providing a gear mounting arrangement with a thin-walled spun riveted tube, a lightweight, inexpensive, and easy to assemble mounting arrangement can be provided.

By providing a gear mounting arrangement with a snap fit cap, a inexpensive and easy to assemble, as well as easy to disassemble, gear mounting arrangement may be provided.

By providing a gear mounting arrangement with a spin riveted tube and a snap fit cap, an inexpensive and easy to assemble and disassemble gear mounting arrangement may be provided.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A mounting apparatus for mounting a rotating element to a housing, the housing defining an opening through a wall of the housing, the mounting apparatus comprising:

a tube including an aperture therethrough, said tube including a first tube portion thereof including a cylindrical outer periphery and a second tube portion thereof connected to the first tube portion and securable to the opening through the wall of the housing, said second tube portion including a distal end having a lip extending outwardly; and a cap including a body portion thereof having a body outer periphery thereof matingly fitted to the aperture of said tube, said cap further includes a flange extending outwardly from a first end of said body portion in a direction perpendicular to the body outer periphery of the body portion of said cap, said cap further including a connector extending from a second end of said body portion opposed to said first end, said connector for connecting said cap to said tube;

wherein the connector extends distal of the lip and is removeably connectable with respect to at least one of the tube and the lip.

2. The mounting apparatus according to claim 1, wherein said first tube portion further includes a shoulder extending outwardly from one end of the cylindrical outer periphery and wherein said second tube portion further includes a stem extending perpendicularly from the shoulder in a direction opposed to first tube portion, said stem having an outer periphery thereof matingly fittable with the opening.

3. The mounting apparatus according to claim 2:

wherein said stem includes a distal end thereof opposed to the first tube portion; and wherein said second tube portion includes said lip extending outwardly from the distal end of said stem.

4. The mounting apparatus according to claim 3, wherein said lip is adapted to be adjacent the wall of the housing.

5. The mounting apparatus according to claim 1, wherein said connector comprises a pliable protrusion.

6. The mounting apparatus according to claim 5, wherein said pliable protrusion extends from the second end of the body portion of said cap in a direction perpendicular to the body outer periphery of the body portion of said cap.

7. The mounting apparatus according to claim 5, wherein said lip has a first constrained position for permitting the protrusion to be fitted within aperture of the cylindrical tube and a second relaxed position for permitting the protrusion to secure said cap to said tube.

8. The mounting apparatus according to claim 1, wherein said tube comprises a metal.

9. The mounting apparatus according to claim 1, wherein said cap comprises a plastic.

10. The mounting apparatus according to claim 1 further comprising a member rotatably associated with the tube.

11. A mounting apparatus for mounting a gear to a cylindrical opening through a wall of a housing for use in a printing machine, comprising:

a cylindrical tube defining an aperture therethrough, said cylindrical tube including a first tube portion thereof including a cylindrical outer periphery and a shoulder extending outwardly from one end of the cylindrical outer periphery, said tube further including a cylindrical stem extending perpendicularly from the shoulder in a direction opposed to the first tube portion, said cylindrical tube having an outer periphery thereof matingly fittable with the cylindrical opening, said cylindrical tube having a distal end further including a lip adapted to extend the wall of the housing and extending outwardly from the outer periphery of said cylindrical stem, said lip is adapted to be formed adjacent the wall of the housing; and a cap including a body portion having an outer periphery thereof matingly fitted to the aperture of said cylindrical tube, said cap further including a flange extending outwardly from a first end of said body portion in a direction perpendicular to the outer periphery of the body portion of said cap, said cap further including a pliable lip extending from a second end of said cap in a direction perpendicular to the outer periphery of the body portion of said cap, said pliable lip having a first constrained position for permitting the pliable lip to be fitted within the aperture of the cylindrical tube and a second relaxed position for permitting the pliable lip to secure said cap to said cylindrical tube wherein the pliable lip of the cap extends distal of the housing and distal of the lip of the cylindrical tube and wherein the pliable lip is removeably connectable with respect to at least one of the tube and the lip.

12. An electrophotographic printing machine of the type having mounting apparatus for mounting a gear to a cylindrical opening through a wall of a housing, said mounting apparatus comprising:

a tube including an aperture therethrough, said tube including a first tube portion thereof including a cylindrical outer periphery and a second tube portion thereof connected to the first tube portion and securable to the opening through the wall of the housing; and a cap including a body portion thereof having a body outer periphery thereof matingly fitted to the aperture of said tube, said cap further includes a flange extending outwardly from a first end of said body portion in a direction perpendicular to the body outer periphery of the body portion of said cap, said cap further including a connector extending from a second end of said body portion opposed to said first end, said connector for connecting said cap to said tube.

13. The printing machine according to claim 12, wherein said first tube portion further includes a shoulder extending outwardly from one end of the cylindrical outer periphery and wherein said second tube portion further includes a stem extending perpendicularly from the shoulder in a direction opposed to first tube portion, said stem having an outer periphery thereof matingly fittable with the opening.

14. The printing machine according to claim 13:

wherein said stem includes a distal end thereof opposed to the first tube portion; and wherein said second tube portion includes a lip extending outwardly from the distal end of said stem.

15. The printing machine according to claim 14, wherein said lip is formed by spin riveting the tube to the wall of the housing.

16. The printing machine according to claim 12, wherein said connector comprises a pliable protrusion.

17. The printing machine according to claim 16, wherein said pliable protrusion extends from the second end of the body portion of said cap in a direction perpendicular to the body outer periphery of the body portion of said cap.

18. The printing machine according to claim 16, wherein said pliable protrusion has a first constrained position for permitting the pliable protrusion to be fitted within the aperture of the cylindrical tube and a second relaxed position for permitting the protrusion to secure said cap to said tube.

19. The printing machine according to claim 12, wherein said tube comprises a metal.

20. The printing machine according to claim 12, wherein said cap comprises a plastic.

* * * * *